United States Patent
Doyon et al.

(10) Patent No.: US 7,613,938 B2
(45) Date of Patent: Nov. 3, 2009

(54) POWER CYCLE CIRCUIT

(75) Inventors: Eric Doyon, Gatineau (CA); Charles Alexander Pearse, Kanata (CA); Tony D'Addona, Stittsville (CA)

(73) Assignee: Alcatel Lucent, Paris (FR)

( * ) Notice: Subject to any disclaimer, the term of this patent is extended or adjusted under 35 U.S.C. 154(b) by 415 days.

(21) Appl. No.: 11/370,618

(22) Filed: Mar. 8, 2006

(65) Prior Publication Data
US 2007/0214372 A1    Sep. 13, 2007

(51) Int. Cl.
G06F 1/26  (2006.01)
G06F 1/28  (2006.01)
G06F 1/30  (2006.01)

(52) U.S. Cl. .................. 713/300; 713/310; 713/323; 713/324

(58) Field of Classification Search .......... 713/300, 713/310, 323, 324
See application file for complete search history.

(56) References Cited

U.S. PATENT DOCUMENTS

| | | | | |
|---|---|---|---|---|
| 5,353,240 | A * | 10/1994 | Mallory et al. | 702/186 |
| 6,625,739 | B1 * | 9/2003 | Kobayashi | 713/310 |
| 6,851,068 | B2 * | 2/2005 | Jochiong et al. | 713/330 |
| 2002/0023233 | A1 * | 2/2002 | O'Meany | 713/300 |
| 2005/0099753 | A1 * | 5/2005 | Liu | 361/118 |
| 2006/0271797 | A1 * | 11/2006 | Ginggen et al. | 713/300 |
| 2006/0277421 | A1 * | 12/2006 | Balestriere | 713/300 |

* cited by examiner

*Primary Examiner*—Thomas Lee
*Assistant Examiner*—Michael J Brown
(74) *Attorney, Agent, or Firm*—Smart & Biggar

(57) ABSTRACT

An apparatus comprises a controller for controlling operation of the apparatus and a switch for switchably coupling electrical power to the controller to enable the controller and apparatus to operate. The controller includes a module for controlling the switch to decouple electrical power from the apparatus, including the controller, and the apparatus further comprises a switch controller for controlling the switch to restore electrical power to the apparatus and controller a predetermined period of time after the switch decouples electrical power therefrom. The apparatus may be embodied in a line card of a communication system and the controller may comprise a control processor for controlling local operations of the line card.

20 Claims, 5 Drawing Sheets

POWER CYCLE CIRCUIT

FIELD OF THE INVENTION

The present invention relates to circuits for controlling power cycles, and in particular, but not limited to, circuits for controlling power cycles in communication devices.

BACKGROUND

A communication network switch typically comprises a number of line cards having communication ports connected to a communication network for transmitting and receiving communication data to and from the network, and a control processor for controlling local operations of the line card. A control card is also provided for monitoring and managing operation of the line cards. Occasionally, events occur which cause line cards to malfunction or become inoperative, and in some cases line cards can be restored to their operative condition by a software reset which causes the software which controls the card to reboot. However, in some situations, a software reset is insufficient to clear the error, and in this case, personnel need to be dispatched into the field to physically inspect the switching element on sight and resolve the problem. In many cases, errors can be cleared and line card operation restored by switching off power to the line card for a predetermined length of time which is typically sufficient to discharge capacitive components on the card, and then restoring power to the card. A power cycle is performed by disconnecting power to the card, which typically requires pulling the card out of the slot, waiting a few seconds, and then reinserting the card into the slot to reconnect power to the card. A drawback of this procedure is that personnel must physically visit the network element site in order to perform a power cycle on the failed line card which is both costly and time consuming.

SUMMARY OF THE INVENTION

According to one aspect of the present invention, there is provided an apparatus comprising: a device; a controller for controlling operation of the device, and a switch for switchably coupling electrical power to the device to enable the device to operate, the controller including a module for controlling the switch to decouple the electrical power from the device, and the apparatus further comprising a switch controller for controlling the switch to restore the electrical power to the device a predetermined time after the switch decouples the electrical power from the device.

In this arrangement, the controller which controls operation of the apparatus controls the switching off of power to a device to enable the device to undergo a power cycle, where power is shut off for a predetermined length of time and then restored.

In some embodiments, the switch controller is operable independently of the controller for controlling the switch to restore the electrical power to the device. In this arrangement, the switch controller enables electrical power to be restored to the device if the module becomes inoperative, for example in the event that power is also removed from the controller.

In some embodiments, the switch is adapted to switchably couple electrical power to the controller to enable the controller to operate, the module is arranged for controlling the switch to decouple electrical power from the device and the controller, and the switch controller is adapted for controlling the switch to restore electrical power to the device and to the controller a predetermined time after the switch decouples the electrical power from the device and the controller. In this arrangement, the module controls switching off of power to both the device and to itself. The switch controller controls the switch to restore electrical power both to the controller and to the device. This arrangement provides a simple and inexpensive means of implementing a power cycle capability. For example, where the apparatus includes a switchable device, such as a power converter, for providing power both to the controller and the device, the arrangement enables a power cycle to be performed simply by controlling the switchable device.

In some embodiments, the apparatus comprises a line card for a communication system and the controller comprises a processor on the line card for controlling operation thereof.

In some embodiments, the controller may include an interface for receiving a signal from a remote location to cause the controller to shut down power to the device, and optionally to itself. This arrangement enables a line card processor to be controlled from a remote location to perform a power cycle on the line card, thereby obviating the need for personnel to physically visit the location of the network element. For example, the power cycle control signal may be sent remotely from a network management system (NMS). Furthermore, since the reset is controlled by the line card's local processor and is performed on itself, line cards can be controlled individually to reset themselves without effecting other line cards.

In some embodiments, the apparatus may include a detector for detecting a condition of the apparatus (e.g. a condition of the device) and the module is responsive to the detection of the condition to control the switch to decouple electrical power from the device.

In some embodiments, the device may comprise a device capable of adopting different states (such as a memory device, for example) and the condition is one in which the device becomes incapable of changing state.

In some embodiments, the switch controller comprises a timing circuit for controlling the predetermined length of time power to the controller is turned off, and for controlling the timing when power to the controller is restored.

In some embodiments, the timing circuit is electrically isolated from the device and/or the controller. For example, the timing circuit may be energized by an electrical power source whose voltage is higher than that required to drive the device and/or the controller. Electrical isolation between the device and/or controller and the timing circuit assists in increasing the reliability of the system in completely removing power from the device and/or controller during the power cycle.

In some embodiments, the module for controlling the switch is adapted to generate and transmit a command to the switch for causing the switch to decouple power to the device and/or controller.

Some embodiments of the apparatus further comprise a verifier or validation circuit for verifying that the command is a valid command for decoupling power from the device and/or controller. The verifier reduces the risk that the controller will initiate a power cycle through a signal that was not intended to cause a power cycle.

In some embodiments, the apparatus comprises a plurality of devices (i.e. two or any other number) which are coupled to the switch to receive power to enable them to operate, and which undergo a power cycle when the switch is turned off.

In some embodiments, two or more switches may be provided, each of which switchably couples power to a different device, and are operable to perform a power cycle, for example, under the control of the or a controller and/or the or a switch controller.

According to another aspect of the present invention, there is provided a circuit card comprising: one or more devices, a controller for controlling operation of the circuit card, and a switch responsive to a command received from the controller, for causing electrical power to at least one device to be decoupled therefrom for a predetermined period of time.

In some embodiments, the switch is responsive to the command for decoupling electrical power to the controller for a predetermined period of time.

In some embodiments, the switch comprises a timing circuit.

In some embodiments, the timing circuit is adapted to transmit a signal to an electrical power device in response to the command, that causes the electrical power to be decoupled from the controller, and after the predetermined period of time, sends a signal to the electrical power device that causes electrical power to the controller to be restored.

In some embodiments, the electrical power device comprises a power converter which may or may not be located on the circuit card.

According to another aspect of the present invention, there is provided an apparatus comprising: a device for performing operations associated with the apparatus, a switch for switchably coupling electrical power to the device to enable the device to operate, the device including a module for controlling the switch to decouple electrical power from the device, and the apparatus further comprising a switch controller for controlling the switch to restore electrical power to the device a predetermined time after the switch decouples electrical power from the device.

In some embodiments, the apparatus further comprises an interface for receiving a control signal for causing the module to control the switch.

In some embodiments, the apparatus comprises a detector for detecting a condition of the apparatus, and wherein the module is responsive to the detection of the condition to control the switch to decouple electrical power from the device.

In some embodiments, the device comprises a controller for controlling operation of the apparatus.

In some embodiments, the device is adapted to perform operations associated with the apparatus, for example one or more other devices associated with the apparatus.

In some embodiments, the device comprises a processor or a logic device, for example a field programmable gate array (FPGA), an application specific integrated circuit (ASIC), a programmable logic device (PLD) or a programmable logic array (PLA).

In some embodiments, the apparatus comprises a communication device, such as a line card of a network element, for example a router or network switch.

According to another aspect of the present invention, there is provided an apparatus comprising: a controller for controlling operation of the apparatus; a switch for switchably coupling electrical power to the controller; a verifier for receiving a control signal and verifying whether the control signal is a valid control signal and for controlling the switch to decouple the electrical power from the controller if the control signal is valid.

Other aspects and features of the present invention will become apparent, to those ordinarily skilled in the art, upon review of the following description of the specific embodiments of the invention.

BRIEF DESCRIPTION OF THE DRAWINGS

Examples of embodiments of the invention will now be described in greater detail with reference to the accompanying drawings, in which.

DETAILED DESCRIPTION OF THE PREFERRED EMBODIMENTS

Figure 1:
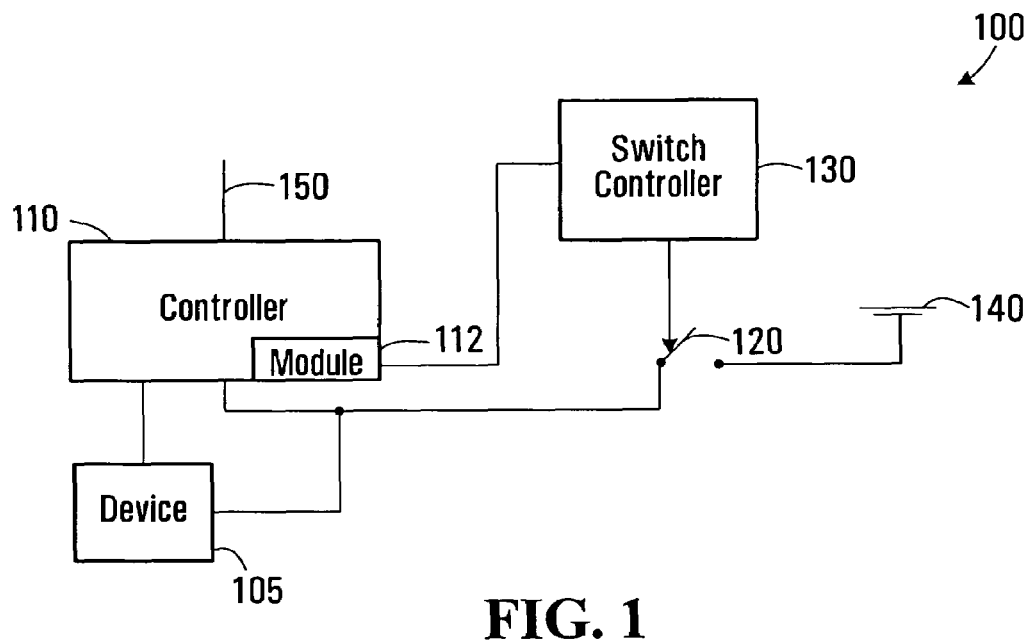
FIG. 1 is a block diagram of an apparatus in accordance with one embodiment of the present invention.

Referring to FIG. 1, an apparatus 100 in accordance with one embodiment of the present invention, comprises a device 105 and a controller 110 for controlling operation of the device. The device 105 and controller 110 are enabled to operate by electrical power from an electrical power source 140. A switch 120 can couple and decouple the electrical power to and from the device 105 and the controller 110. The controller 110 includes a module 112 for controlling the switch to decouple the electrical power source 140 from the device 105 and the controller 110. The apparatus also includes a switch controller 130, which controls the switch 120 to restore the electrical power from the power source 140 to the device and controller after a predetermined time has elapsed from decoupling the electrical power from the device and the controller.

Therefore, in operation the module 112 for controlling the switch 120 can issue a command to the switch 120 to decouple the electrical power from the controller 110, thus cutting off its own power. The switch controller 130 will restore the electrical power after a predetermined time has elapsed from decoupling.

In this arrangement, both the controller and device are driven from a voltage source through a common switch, which therefore controls power to both elements. The provision of a switch controller 130 which is operable independently of the controller 110, to restore power to the device and controller, allows the reset or power cycle to be performed by the common switch, which results in power to both the device and the controller to be turned off for a period of time. With the same arrangement, the power cycle can be initiated by the controller 110.

In some embodiments the switch controller 130 is a timing circuit. One example of a timer that can be used in such a timing circuit is an ICM 7555 timer. In some embodiments, the timing circuit is electrically isolated from the controller 110. This may be achieved using, for example, a relay switch, a transformer or an optical coupler.

In some embodiments, the timing circuit requires power to operate and may receive electrical power other than via the switch 120. In other embodiments, the timing circuit may receive power through the switch 120, and store electrical power to enable it to operate.

In some embodiments, the device includes one or more capacitive elements or has electrical capacitance, and the predetermined period of time after which the switch controller 130 restores power is sufficient to allow the capacitive element(s) or capacitance to discharge. Advantageously, this provides a power cycle that enables the apparatus to fully power down.

In some embodiments the module 112 for controlling the switch 120 controls the switch by sending a command to the switch to decouple power. The apparatus may also comprise a verifier for verifying that the command issued by the module 112 is a valid command for decoupling power from the controller 110. Verifying that the command is a valid command as a pre-requisite to switching off power to the controller assists in preventing power to the controller from being turned off accidentally, by, for example, an erroneous signal from the controller.

In some embodiments, the controller is a processor or logic device located on a line card in a communication system.

An interface, for example, interface 150, may be provided for transmitting signals to the controller from another device and/or a remote location. The interface may be used to transmit to the controller a signal for causing the controller to perform a power cycle on the device and on itself. In some embodiments, the apparatus may include a detector for detecting a malfunction or other (fault) condition and the controller may be responsive to the detected condition to perform a power cycle.

Figure 2:
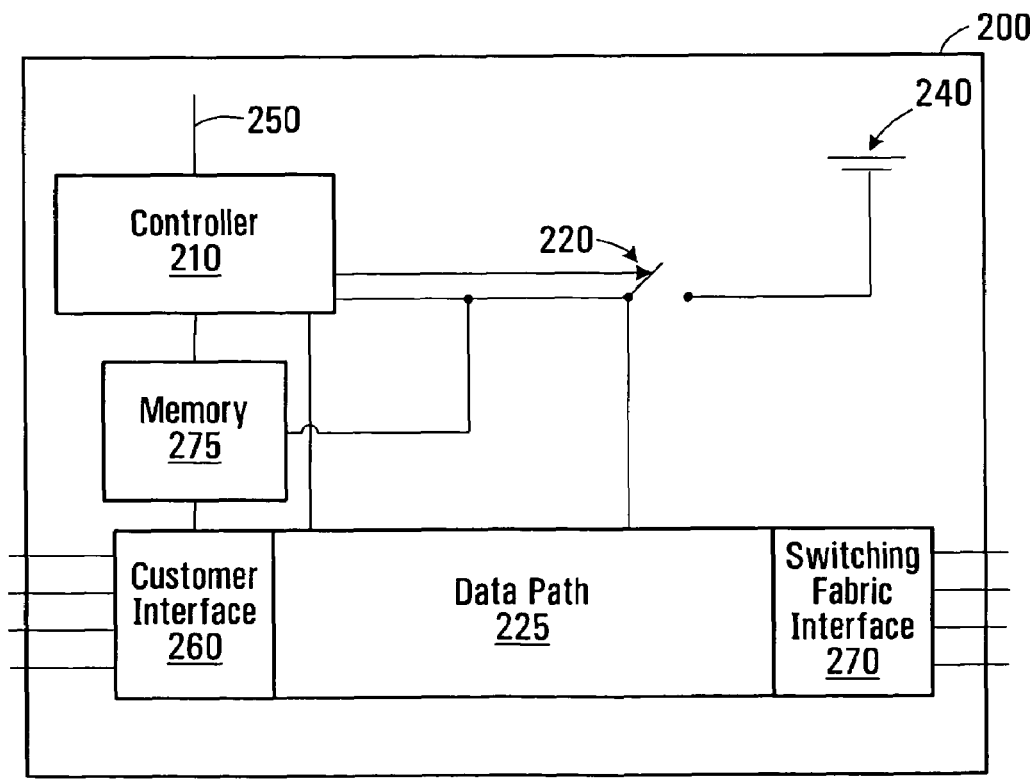
FIG. 2 is a block diagram of a circuit card in accordance with one embodiment of the present invention.

Now referring to FIG. 2, a further embodiment of the present invention is a circuit card 200 comprising a controller 210, a data path 225 which includes a customer interface 260 and a switching fabric interface 270, a memory 275 and a switch 220, which is operable to switchably couple/decouple an electrical power source 240 to and from the controller, the data path and the memory. The switch 220 is responsive to a command received from the controller 210 to cause the electrical power source 240 to be decoupled from the controller 210, the data path 225 and the memory 275 for a predetermined period of time.

In some embodiments the switch 220 comprises a timing circuit which performs a similar function to the timing circuit described with reference to FIG. 1. Some embodiments of the timing circuit send a signal to an electrical power device that causes the electrical power source 240 to be decoupled from the controller 210, the data path and the memory. The timing circuit then sends another signal to the electrical power device after the predetermined period of time has elapsed that causes the electrical power to be restored to the controller 210. One example of an electrical power device is a DC power converter located either on or off the circuit card.

As with the apparatus described with reference to FIG. 1, the timing circuit of the circuit card 200 may also be electrically isolated from the controller by any one or more of a relay switch, a transformer, an optical coupler, or any other suitable device.

The circuit card 200 may also comprise a verifier (not shown) for verifying that the command received from the controller is a valid command for decoupling the electrical power source 240 from the controller 210, the data path 225 and the memory 275.

An interface, for example, interface 250, may be provided for transmitting signals to the controller from another device and/or a remote location. The interface may be used to transmit to the controller a signal for causing the controller to perform a power cycle on elements of the card connected to receive power through the switch 220. In some embodiments, the apparatus may include a detector for detecting a malfunction or other condition (e.g. fault condition) and the controller may be responsive to the detected condition to initiate a power cycle. For example, the memory or part thereof may acquire a fixed state from which it cannot return. The controller or another device may be operable to detect this condition, and the controller responds by initiating a power cycle to reset the memory, as required.

Figure 3:
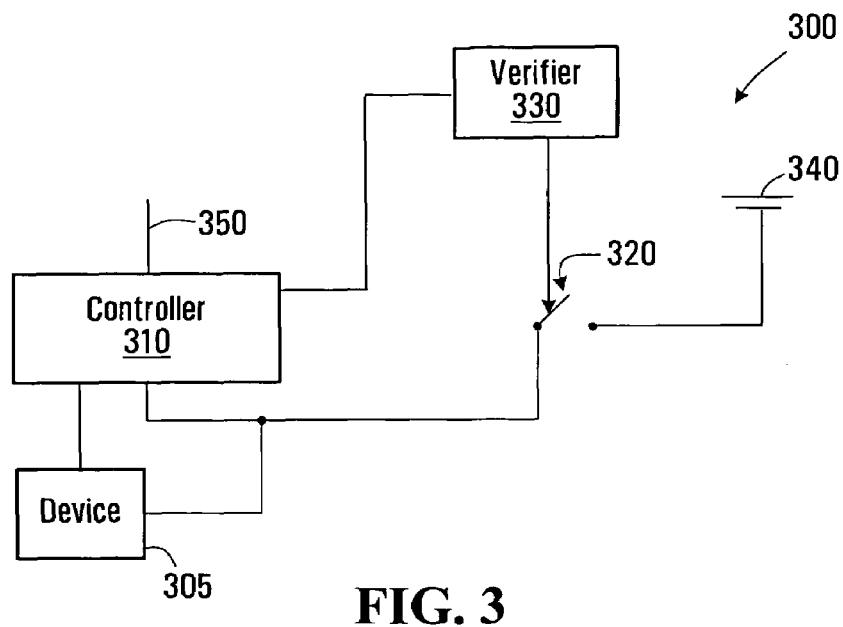
FIG. 3 is a block diagram of an apparatus in accordance with one embodiment of the present invention.

FIG. 3 is a block diagram of another exemplary embodiment of the present invention. An apparatus 300 comprises a device 305 and a controller 310 for controlling operation of the device, a switch 320 for coupling an electrical power source 340 to the device and the controller, and a verifier 330 for receiving a control signal and verifying whether the control signal is a valid control signal. The verifier 330 further controls the switch 320 to decouple the electrical power 340 from the controller 310 if the control signal is valid.

In some embodiments, the control signal is received from the controller 310. In these embodiments, the controller 310 is adapted to issue a command to shut down power to the device and to itself. In other embodiments, the control signal is received from a device external of the apparatus.

An interface, for example, an interface 350, may be provided for transmitting signals to the controller from another device and/or a remote location. The interface may be used to transmit to the controller a signal for causing the controller to perform a power cycle on the device and on itself. In some embodiments, the apparatus may include a detector for detecting a malfunction or other condition (e.g. fault condition) and the controller may be responsive to the detected condition to perform a power cycle.

In some embodiments, the verifier 330 comprises a sequence decoder and the control signal comprises a coded sequence. The sequence decoder decodes the coded sequence and verifies that the decoded sequence is a correct sequence for decoupling the electrical power 340 from the controller 310. The control signal may also comprise an enable command. In these embodiments, the verifier 330 will only control the switch 320 to decouple the electrical power source 340 from the controller 310 if the decoded sequence is the correct sequence and the enable command is received.

In some embodiments, the verifier 330 also comprises an interface for interfacing with the controller 310. As with the previously described embodiments, the switch 320 may comprise a timing circuit.

The apparatus described with reference to FIG. 3 may be located on a circuit card such as a line card in a communication system. The controller may comprise a processor (or logic device) for controlling and/or monitoring functions of one or more components of the line card.

Figure 4:
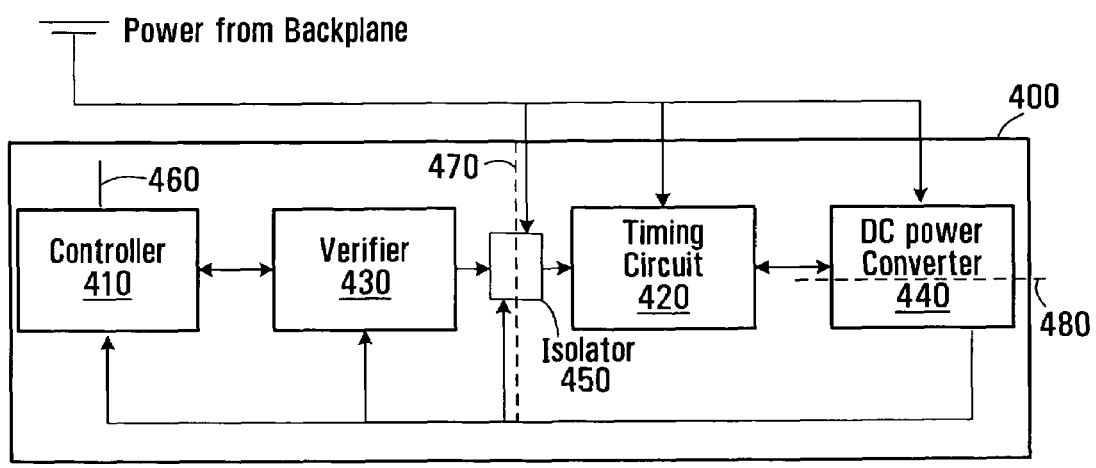
FIG. 4 is a block diagram of a circuit card in accordance with one embodiment of the present invention.

FIG. 4 is a block diagram of a circuit card 400 in accordance with a specific embodiment of the present invention. The circuit card comprises a controller 410, a verifier 430, a timing circuit 420 and a DC power converter 440. The DC power converter 440 and the timing circuit 420 receive power from a power source, for example a back plane. The controller 410 receives electrical power from the DC power converter 440. The controller 410 controls operation of the circuit card 400 (for example one or more device thereon—not shown) and can issue a command that directs the timing circuit 420 to send a signal to the DC power converter 440 to shut down power to the controller 410 and one or more elements of the card that receive power from the power converter. The timing circuit 420, which is powered by the back plane, is adapted to then automatically send a second signal after a predetermined period of time to the DC power converter 440 to restore power to the controller 410. The verifier 430 verifies that the command from the controller 410 is a valid command for decoupling power. A further feature of the circuit card 400 is an isolator 450 which electrically isolates the timing circuit from the controller. In FIG. 4, the isolator 450 is positioned between the timing circuit 420 and the verifier 430. The isolator 450 may be a relay, a transformer or an optical coupler or any device that will achieve the function of electrically isolating the timing circuit from the other devices on the circuit card.

In this embodiment, one side of the isolator 450 (e.g. to the left of the dashed line 470) is coupled, when operative, to the output side of the power converter, and the other side of the isolator 450 and the timer are connected to receive power from the back plane. In this embodiment, the power converter has a switch on the power input side (e.g. above the dashed line 480 in FIG. 4), and the timing circuit is adapted to control this switch to couple/decouple power to the controller and verifier and any other elements connected to receive power from the power converter.

In other embodiments, the timing circuit could be adapted to control a switch on the output side of the power converter. In other embodiments, the power converter may comprise an a/c power converter, depending on the requirements of the system.

An interface, for example, an interface 460, may be provided for transmitting signals to the controller from another device and/or a remote location. The interface may be used to transmit to the controller a signal for causing the controller to perform a power cycle on the card. In some embodiments, the card may include a detector for detecting a malfunction or other condition (e.g fault condition) and the controller may be responsive to the detected condition to initiate a power cycle.

Figure 5:
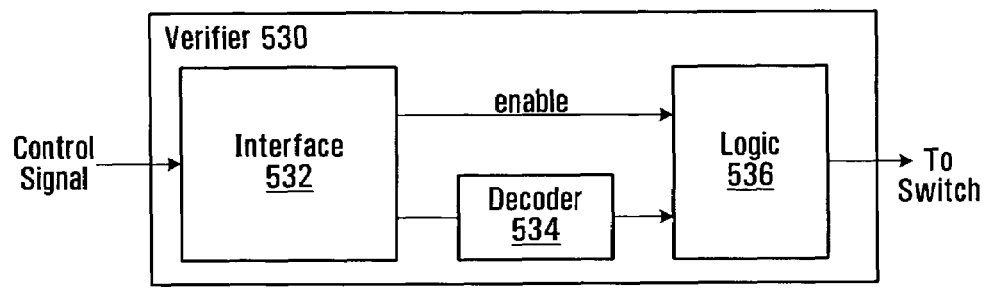
FIG. 5 is a block diagram of a verifier in accordance with one embodiment of the present invention.

FIG. 5 is a block diagram of an exemplary embodiment of a verifier 530 that may be used in any of the apparatuses or circuit cards described herein. The verifier 530 comprises an interface 532 for interfacing with a device that issues a control signal for decoupling power from a controller. The control signal received by the interface comprises an enable command and a coded sequence. The coded sequence is decoded by a decoder 534 and both parts of the control signal are then processed by logic 536, which may, for example comprise a logic gate such as an AND gate, or other logic device for performing a logical operation on the two signals. If both the enable command and the decoded sequence are valid, the verifier 530 will issue a signal to a switch to decouple power from the controller.

The verifier may be implemented by any suitable circuit, including but not limited to an FPGA (Field Programmable Gate Array), a Programmable Logic Device or Array (PLD or PLA) or other integrated circuit device.

Figure 6:
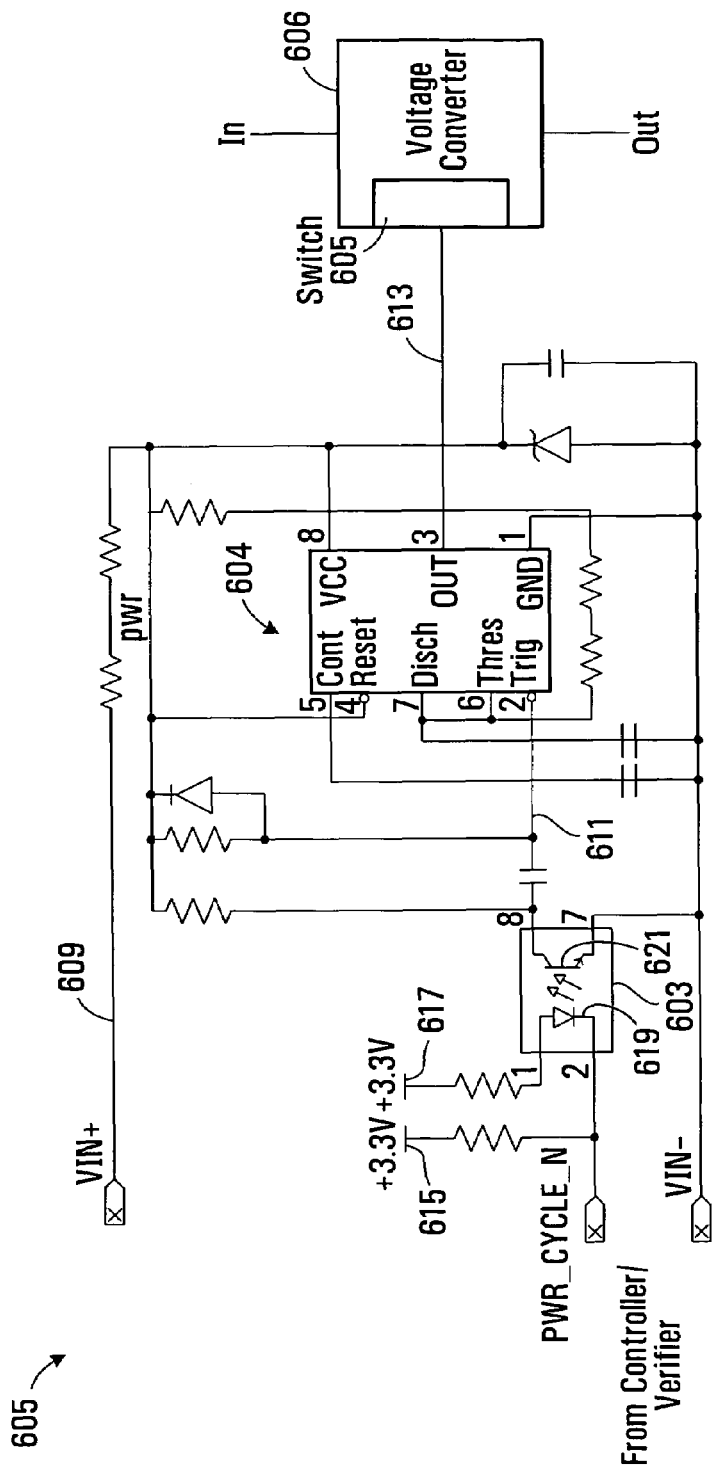
FIG. 6 is a circuit diagram of a timing circuit in accordance with one embodiment of the present invention.

FIG. 6 is a circuit diagram of a timing circuit of a specific embodiment of the present invention that may be used in any of the apparatuses or circuit cards described herein.

Referring to FIG. 6, the circuit comprises an electrical isolator 603, for example an optical coupler, a timer circuit 604, and a switch 605, which on/off controls a voltage converter 606. The timer circuit 604 is coupled to receive electrical power from a suitable power source, for example a voltage rail 609. The timer 604 includes a signal input 611 for receiving an input signal from the optical coupler 603, and an output 613 for controlling the switch 605. In one embodiment, the voltage converter 606 is adapted to down convert an input voltage from a suitable voltage source (e.g. a back plane voltage source) to a reduced voltage which is suitable for energizing a controller, for example a processor for controlling functions and operations of a line card and one or more other device(s) of the line card. In this embodiment, the voltage converter 606 provides a reduced voltage to the controller (not shown) and to terminals 615, 617 coupled to the input side of the optical coupler 603.

An example of operation of the circuit of FIG. 6 will now be described with reference to the timing diagram of FIG. 7.

Figure 7:
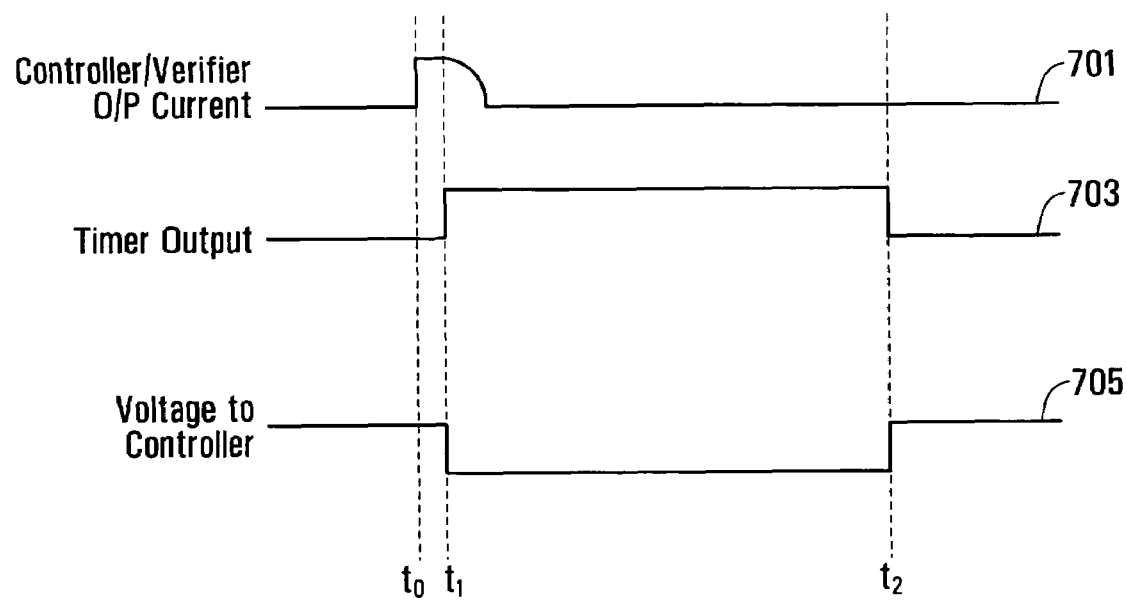
FIG. 7 shows an example of a timing diagram for illustrating operation of an embodiment of the invention.

Referring to FIG. 7, when the apparatus is to undergo a power cycle, the controller generates and transmits a signal or command to cause the power controlling circuitry to turn off power to the apparatus, including the controller. As indicated in the embodiments described above, the signal or command may be optionally verified as a valid signal or command for turning off power to the apparatus so that the signal or command or another signal generated in response thereto is only passed to the power controlling circuit if the signal is valid. In the circuit of FIG. 6, in response to a power cycle command from the controller, a switch (not shown) is closed at time t0, to enable current to flow through the light emitting diode 619 of the optical coupler 603. This signal is shown as the first trace 701 in FIG. 7. Light emitted by the light emitting diode is received by the photo detector 621 of the optically coupled isolator 603 and starts the timer 604 at time $t_1$. At the same time, the timer causes the voltage at the output 613 to change from low to high, as shown by the second trace 703 in FIG. 7, and this causes the switch 605 of the voltage converter 606 to switch off power to the apparatus and controller, as shown by the third trace 705 in FIG. 7.

After a predetermined time, for example four to five seconds, (or any other time interval), the timer causes the voltage at the output 613 to change from high to low, as indicated by trace 703, causing the voltage converter to restore power to the apparatus at time $t_2$, as shown by trace 705.

In this embodiment, the switch 605 is responsive to a positive change in the control signal to switch off the power converter. Thus, in this embodiment, it is to be noted that the power converter is responsive to a voltage of a larger magnitude in order to switch off power to the apparatus and controller, and a lower or zero voltage is required to cause the voltage converter to provide power to the apparatus and controller. Thus, in the normal state where the voltage converter supplies power to the apparatus and controller, no or little voltage is required from the output of the timer circuit. In other embodiments, the switch is responsive to a negative change in the control signal to switch off power to the converter. In this latter embodiment, an invertor may be connected to the output 613 of the timer circuit to invert the signal to the switch 605.

In other embodiments of the invention, the switch may be implemented to switchably couple only the controller to the power source to enable the controller to undergo a power cycle, or the switch may be implemented to switchably couple one or more devices to the power source under the control of the controller, and the controller may be powered separately and not undergo the power cycle.

Embodiments of the invention may be implemented in any apparatus or application, and are not limited to communication devices.

Other aspects and embodiments of the invention comprise any one or more features disclosed herein in combination with any one or more other features or a variant or equivalent thereof.

In any of the aspects and embodiments of the invention disclosed herein, any one or more features may be omitted altogether or substituted by another feature which may comprise an equivalent or variant thereof.

What has been described is merely illustrative of the application of the principles of the invention. Other arrangements and methods can be implemented by those skilled in the art without departing from the spirit and scope of the present invention.

The invention claimed is:

1. A circuit card comprising:
   a device;
   a controller for controlling operation of the device, and
   a switch for switchably coupling electrical power to the device to enable the device to operate,
   the controller including a module for controlling the switch to decouple the electrical power from the device,
   and the circuit card further comprising a switch controller, operable independent of the controller, for controlling the switch, if the switch also decouples electrical power from the controller, to restore the electrical power to the device and the controller a predetermined time after the switch decouples the electrical power from the device and the controller.

2. The circuit card as claimed in claim 1, wherein said switch controller is operable independently of said controller for controlling the switch to restore said electrical power.

3. The circuit card as claimed in claim 2, wherein said switch is adapted to switchably couple electrical power to the controller to enable the controller to operate, said module is arranged for controlling the switch to decouple the electrical power from the device and the controller, and the switch controller is adapted for controlling the switch to restore the electrical power to the device and to the controller a predetermined time after the switch decouples the electrical power from the device and the controller.

4. The circuit card of claim 1, wherein the switch controller comprises a timing circuit.

5. The circuit card of claim 4, wherein the timing circuit is electrically isolated from the controller.

6. The circuit card of claim 1, wherein the device has capacitance and the predetermined period of time is sufficient to substantially discharge said capacitance after power is decoupled from the device.

7. The circuit card of claim 1, wherein the module for controlling the switch is configured to send a command to the switch to cause said switch to decouple said electrical power.

8. The circuit card of claim 7, further comprising a verifier for verifying that the command is a valid command for decoupling power from the device.

9. The circuit card of claim 1, further comprising a power converter for receiving power from a power source and supplying converted power to said device, and wherein said switch is adapted for switchably coupling the converted power to said device.

10. The circuit card of claim 9, wherein said switch is configured for switchably coupling said power converter to said source of electrical power.

11. The circuit card of claim 1, further comprising a substrate, and wherein said controller and said device are both disposed on said substrate.

12. The circuit card of claim 1, wherein the device comprises a data storage device.

13. A circuit card comprising:
    one or more devices,
    a controller for controlling operation of the circuit card,
    a switch responsive to a command received from the controller, for causing electrical power to at least one device to be decoupled therefrom for a predetermined period of time, and
    an electrical power device, operable independent of the controller, that causes electrical power to the at least one device and the controller to be restored after the predetermined time period if the electrical power was also decoupled from the controller.

14. The circuit card as claimed in claim 13, wherein said switch is responsive to said command for decoupling electrical power to said controller for a predetermined period of time.

15. The circuit card according to claim 13, wherein the switch comprises a timing circuit.

16. The circuit card according to claim 15, wherein, in response to the command, the timing circuit sends a signal to the electrical power device that causes the electrical power to be decoupled from the device and after the predetermined period of time sends a signal to the electrical power device that causes the electrical power to said device to be restored.

17. The circuit card according to claim 13, further comprising a verifier for verifying that the command is a valid command for decoupling the electrical power from the controller, and wherein said verifier comprises a sequence decoder for decoding a coded sequence and verifying that the decoded sequence is a correct sequence.

18. The circuit card of claim 17, wherein the verifier requires both the correct sequence and an enable command before controlling the switch to decouple the electrical power from at least one device.

19. A circuit card comprising:
    a device for performing operations associated with the circuit card,
    a switch for switchably coupling electrical power to the device to enable the device to operate,
    the device including a module for controlling the switch to decouple electrical power from the device, and
    the circuit card further comprises a switch controller, operable independent of the device, for controlling the switch to restore electrical power to the device a predetermined time after the switch decouples electrical power from the device if the switch decoupled electrical power from the device.

20. The circuit card as claimed in claim 19, further comprising at least one of (a) an interface for receiving a control signal for causing said module to control said switch, and (b) a detector for detecting a condition of said circuit card, and wherein said module is responsive to the detection of said condition to control said switch to decouple electrical power from said device.

* * * * *

UNITED STATES PATENT AND TRADEMARK OFFICE
CERTIFICATE OF CORRECTION

| | | |
|---|---|---|
| PATENT NO. | : 7,613,938 B2 | Page 1 of 1 |
| APPLICATION NO. | : 11/370618 | |
| DATED | : November 3, 2009 | |
| INVENTOR(S) | : Doyon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 655 days.

Signed and Sealed this

Nineteenth Day of October, 2010

David J. Kappos
*Director of the United States Patent and Trademark Office*